Oct. 22, 1957  H. E. GLODDE  2,810,193
TOOLS
Filed Oct. 28, 1955
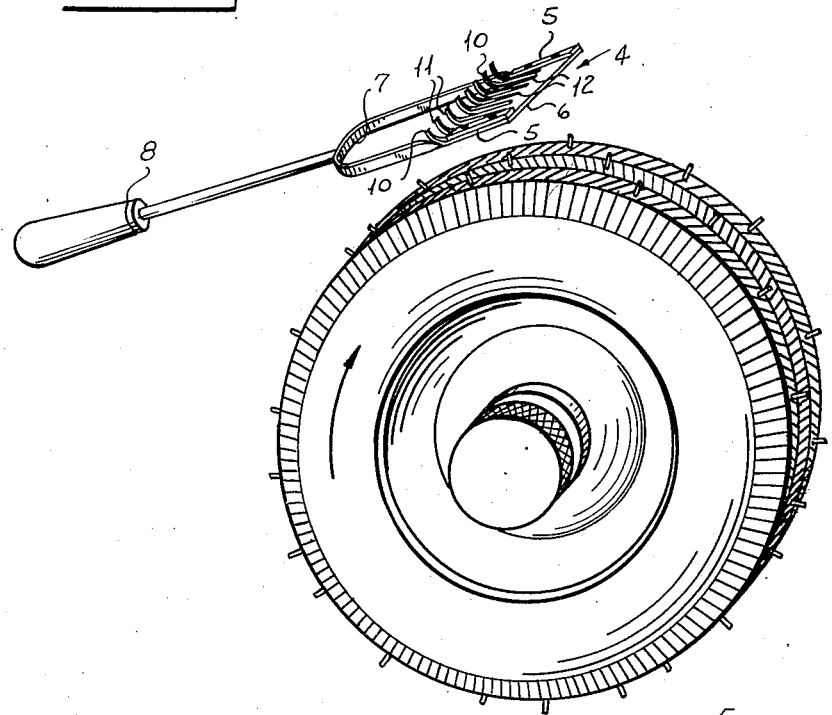
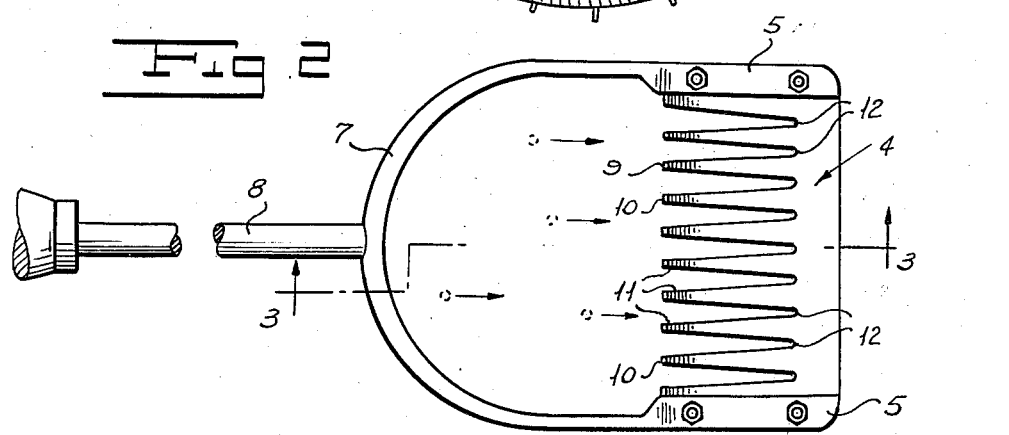
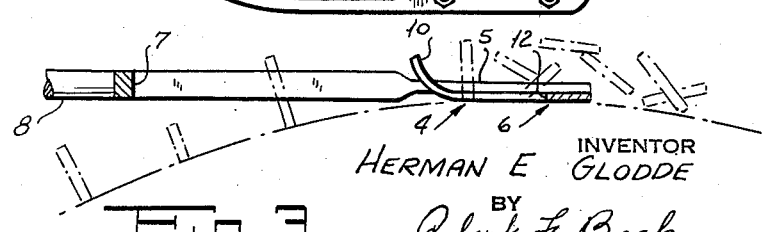
INVENTOR
HERMAN E. GLODDE
BY
Robert F. Beck
ATTORNEY

United States Patent Office 2,810,193
Patented Oct. 22, 1957

2,810,193

TOOLS

Herman E. Glodde, Franklin Lakes, N. J.

Application October 28, 1955, Serial No. 543,497

1 Claim. (Cl. 30—280)

My invention relates to tools and more particularly to tools for removing scraps, strings or remnants from tire casings and the like.

One of the objects of my invention is to provide a tool for removing remnants or strings from a tire casing and which is constructed in a manner to facilitate severing of the remnants or strings without injury to the casing or tool.

Another object of my invention is to provide a tool of the foregoing described character equipped with a readily replaceable blade for effecting removal of the remnants.

An important object of my invention is to provide a tool of the foregoing described character which is simple in construction, durable in use, efficient in operation, and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a perspective view of my invention disposed above a tire casing.

Figure 2 is a top plan view of the tool.

Figure 3 is a detail sectional view taken on the line 3—3 of Figure 2.

In practicing my invention, as illustrated in the drawing, I provide an elongated blade or comb-member 4 having its ends connected, by means of bolts and nuts, to the spaced side sections or arms 5 of a blade holder, the plate being provided with a casing engaging bottom face 6. The arms 5 are connected together, at coincident ends, by a bowed section or yoke 7 of the holder, a handle 8 being attached to the yoke and extending outwardly therefrom. One side of the member 4, proximus the section 7, is formed with teeth 9 extending towards the handle and having their outer end portions 10 terminating out of the confines of the yoke and clearly illustrated in Figure 3 of the drawing. The teeth are of a somewhat elongated triangular shape with their sides being beveled to provide cutting edges 11. The inner end portions or roots of the teeth are closely spaced to define cuneiform pockets 12 therebetween.

In use, the bottom face 6 of the blade 4 is disposed in engagement with the circumferential face of a rotating tire casing and manipulated thereagainst in a manner wherein the rubber strings, scraps or other remnants attached or clinging to the casing, by reason of retreading or fabrication, will be guided or forced between the teeth 9 and severed from the casing by the cutting edges 11 or shredded therefrom by wedging within the pockets 12. It will be noted that the outer end portions 10 of the teeth are disposed away from the tire casing and in spaced relation thereto thereby precluding the end portions from "digging" into the casing and damaging either the latter or the teeth. Furthermore, by removing the aforementioned nuts and bolts, the blade may be readily detached to permit sharpening or replaced with a new one.

From the foregoing, it will be apparent that I have provided a novel and efficient tool for removing undesirable rubber strings, scraps, remnants or other undesirable material from a tire casing after the latter has been processed for ultimate use. Furthermore, while I have disclosed my invention as comprising a tool adapted to be manually manipulated for removing the strings and remnants from a tire casing, it is to be understood that the tool may also be constructed in a manner for attachment to mechanical means for operating the tool over the casing for removing said strings and remnants.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claim.

What I claim is:

In a tool for removing thread-like material projecting from the tread of a tire casing, a flat blade having oppositely related flat end portions and a tread engaging surface extending between said portions, said blade having leading and trailing edges, a yoke having spaced side sections connected flat on said flat end portions for holding said blade in flat engagement with said casing, a handle attached to said yoke forwardly of said leading edge extending substantially in the plane of said flat blade, said leading edge formed with relatively narrow triangular shaped teeth for receiving said material therebetween, said teeth provided with lengthwise extending cutting edges for severing material from said casing when said material is moved between said teeth, said teeth extending from said leading edge towards said handle and having their free ends curved away from said surface to preclude said ends of said teeth from penetrating said casing during movement relative thereto.

References Cited in the file of this patent

UNITED STATES PATENTS

| | | |
|---|---|---|
| 655,692 | Dana et al. | Aug. 14, 1900 |
| 964,453 | Robarge | July 12, 1910 |
| 2,503,961 | Meunier | Apr. 11, 1950 |